Aug. 22, 1950     L. J. ZERBEE     2,519,532
FIX FINDER
Filed June 16, 1949     3 Sheets-Sheet 2
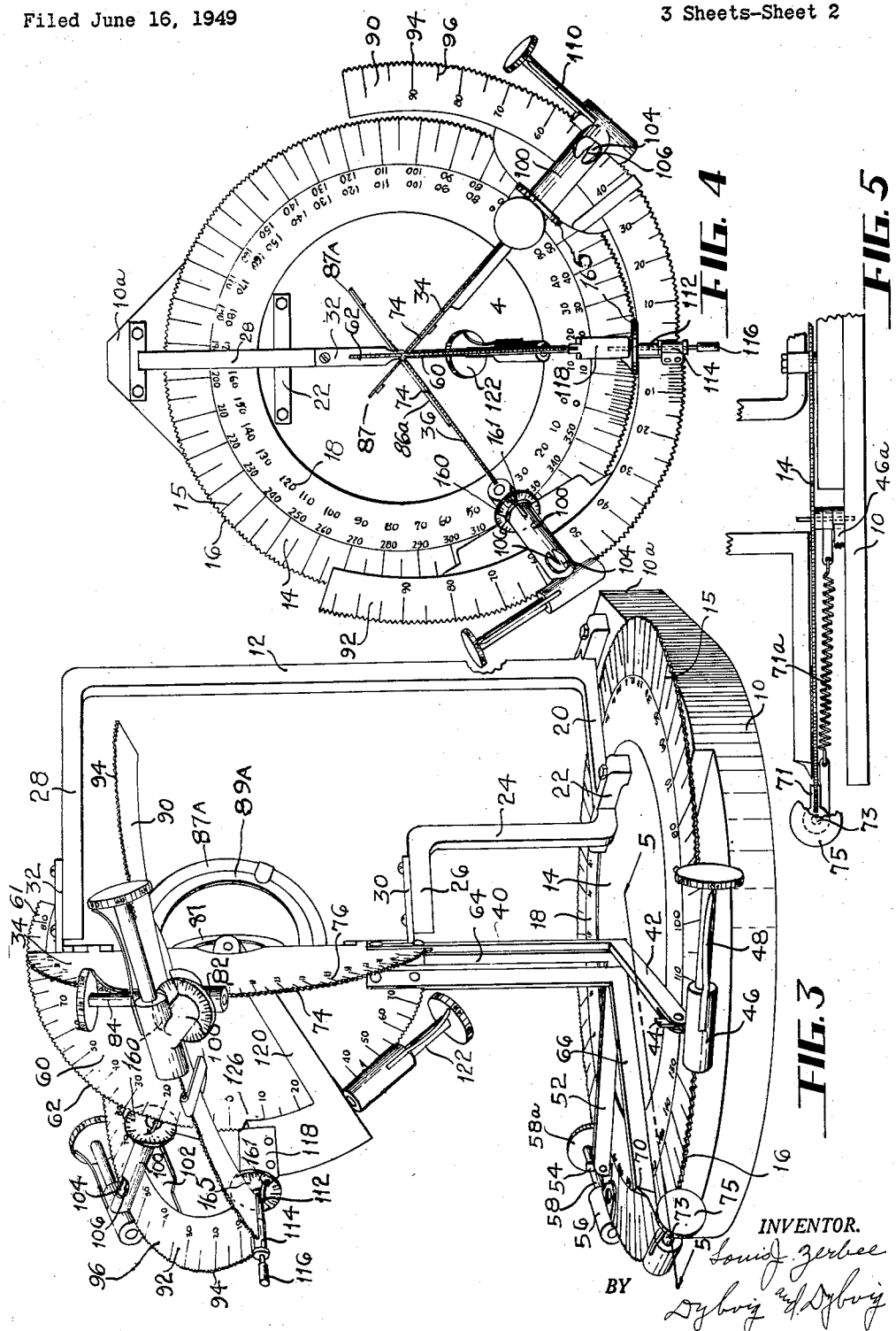
INVENTOR.
Louis J. Zerbee
BY Dybvig and Dybvig
HIS ATTORNEYS Aug. 22, 1950
L. J. ZERBEE
2,519,532
FIX FINDER
Filed June 16, 1949
3 Sheets-Sheet 3
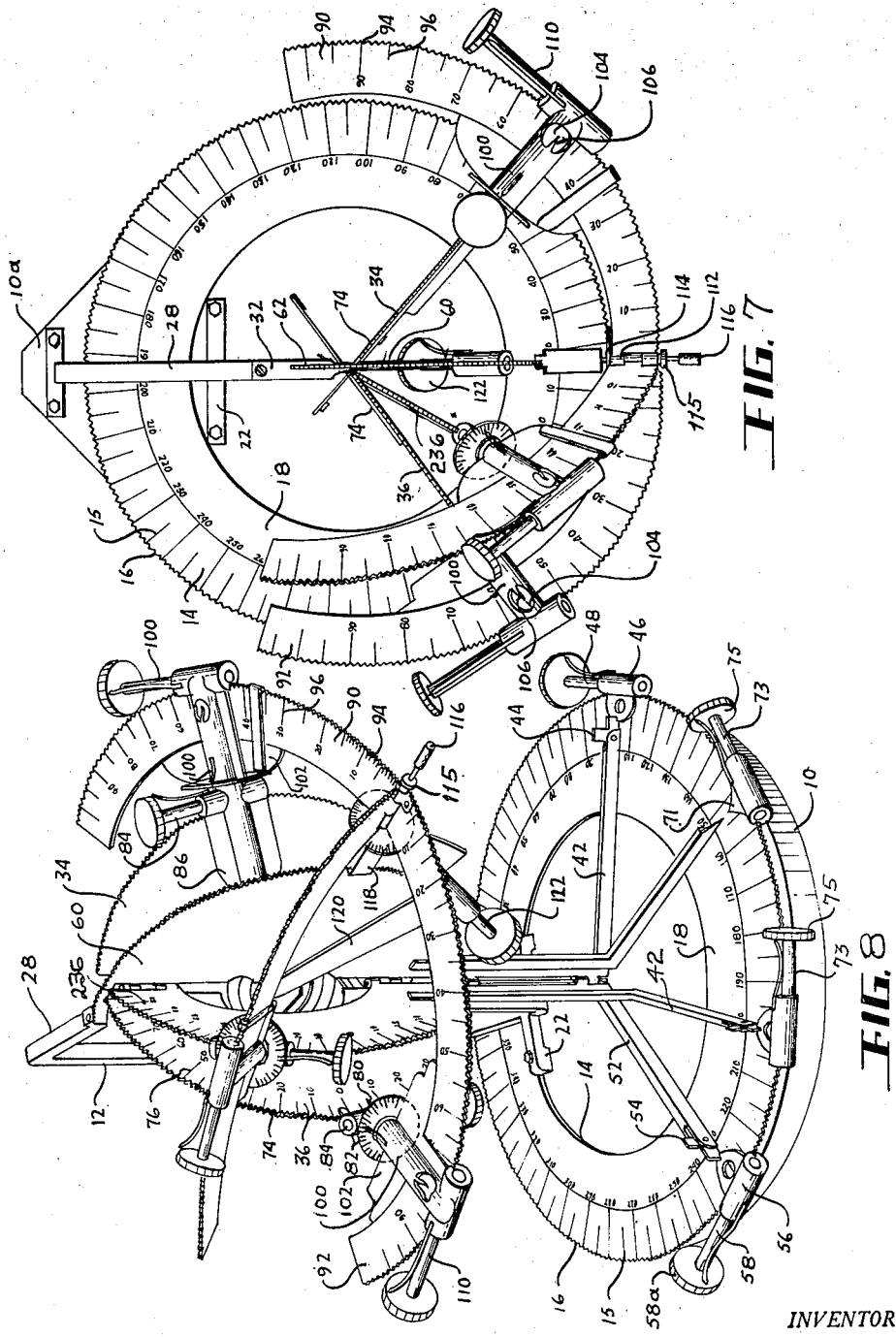
INVENTOR.
LOUIS J. ZERBEE
BY
Dybvig and Dybvig
HIS ATTORNEYS Patented Aug. 22, 1950

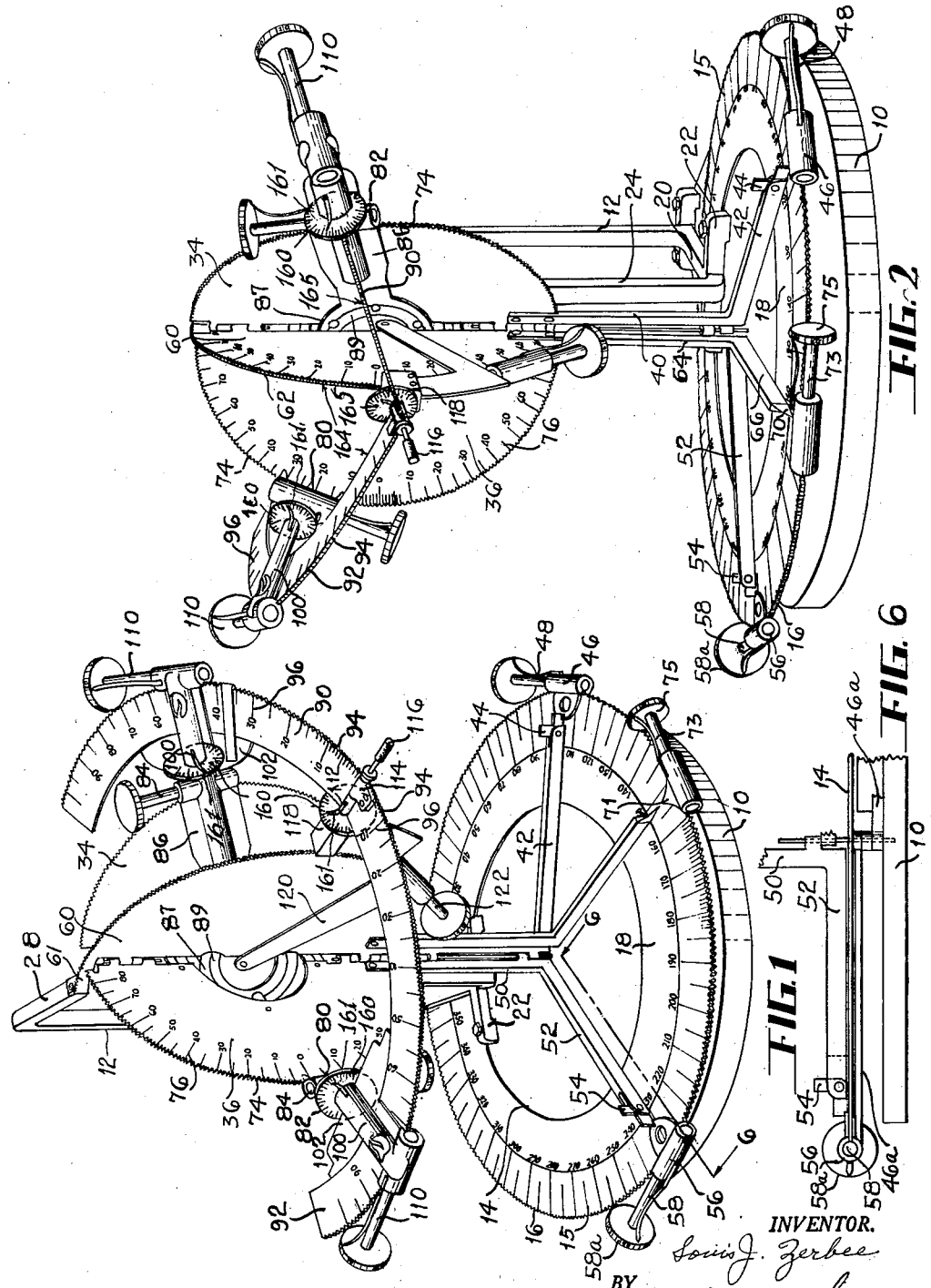

2,519,532

UNITED STATES PATENT OFFICE 2,519,532

FIX FINDER

Louis J. Zerbee, Bellefontaine, Ohio

Application June 16, 1949, Serial No. 99,491

7 Claims. (Cl. 33—1)

This invention relates to an instrument for solving one or more spherical triangles simultaneously, that is, an instrument for use in connection with celestial navigation.

Celestial navigation is based upon sextant or octant observations of celestial bodies which will be referred to hereinafter as stars. Furthermore, in most parts of the world the observations are based upon correct Greenwich time and data obtained from the American Nautical Almanac compiled by the United States Naval Observatory.

The information obtained from the sextant, the chronometer and the almanac is used in constructing spherical triangles on the face of the earth. By the solution of the spherical triangles it is possible to designate or find the position of the person, hereinafter referred to as the observer, making the observation with the sextant.

From the American Nautical Almanac one may determine the sub-stellar spot, that is, the exact point at which a line drawn from the center of the earth to a predetermined star intersects the surface of the earth. The point is generally identified by Greenwich hour angle and declination.

By means of a sextant, it is possible to determine the angular distance of a substellar spot from the position of the observer, that is, one side of a spherical triangle.

As is well known to those skilled in the art, the solution of spherical triangles is a long and tedious operation. Consequently, through the course of many years, various short-cuts or approximations have been devised by scientists, astronomers and navigators, to simplify the solution of a spherical triangle or the finding of a "fix." The method now generally used consists of voluminous tables of solutions of parts, complete and combinations of spherical triangles, together with a Mercator's chart upon which is plotted the calculations that are obtained from the tables and the sextant observation. Even with these short-cuts, the time required by the best navigators is very often more than thirty minutes. The possibility of error is great, for the reason that in leafing through the voluminous tables, one is very apt to select the wrong figures or make error in recording such figures, resulting, of course, in an incorrect answer or "fix." The term "fix," as used in navigation, is a point where two definite lines cross, illustrative of which is where meridians of longitude and parallels of latitude cross.

An object of this invention is to eliminate the necessity of carrying voluminous tables (especially on airplanes) and to reduce the time and drudgery now necessary to find a "fix" from celestial bodies. This is accomplished by mechanically constructing spherical triangles over a theoretical centrally located globular map and measuring their various sides and angles on arcuate members by means of micrometers. Measurements wherever taken are automatically adjusted to equatorial value, before micrometers measure them.

Solutions of spherical triangles are the basis of many other astronomical problems, such as time, distances, etc. This device is equally valuable in such matters.

Another object of the invention is to solve problems of location by the circles of equal altitude without the use of Mercator charts.

Another object of this invention is to provide an instrument wherein all adjustments are made with respect to angular positions emanating from a common point representing the center of the earth.

Other objects and advantages reside in the construction of parts, the combination thereof and the mode of operation, as will become more apparent from the following description.

In the drawings, Figure 1 is a perspective view of the fix finding device.

Figure 2 is another perspective view as viewed from the right of Figure 1.

Figure 3 is a side elevational view.

Figure 4 is a top plan view.

Figure 5 is a fragmentary, cross sectional view, taken substantially on the line 5—5 of Figure 3.

Figure 6 is a fragmentary, cross sectional view, taken substantially on the line 6—6 of Figure 1.

Figure 7 is a top plan view of a fix finding device that may be used in solving three spherical triangles.

Figure 8 is a perspective view of the fix finding device disclosed in Figure 7.

Referring to the drawings, the reference character 10 indicates a base, the rear end of which terminates in a triangular portion 10a supporting a vertically disposed standard 12. The base 10 also supports a circular disc 14 provided with graduations 15 and marginally disposed gear teeth 16. The disc 14 is fixedly secured to the base in any suitable manner. A ring or scale 18 is mounted for rotation on the annular disc 14. This is to permit adjustment of the degree scale 18 with respect to the disc 14 for reasons that will appear more fully later. The ring 18 is provided with equally spaced numbers from 0 to 180 on one half and 0 to 180 on the other half. Said numerals corresponding to the degrees of longitude both east and west. Another set of numerals progressing clockwise from 0 to 360 represent Greenwich hour angles. The degree scale or ring 18 may be rotated into any desirable position so as to permit the solution of a particular problem without the frame 12 interfering with the adjustment of the fix finder. The zeros on both scales are in a common position. The standard 12 is provided with a horizontally disposed portion 20 extending over the disc 14 and secured thereto by a cross bar 22 provided with bolts for bolting the cross bar 22 to the base 10. The portion 20 terminates in an upwardly directed leg 24 merging into a horizontal portion 26. The standard 12 terminates in a horizontal portion 28.

The horizontal portions 26 and 28 support a pair of bearing members 30 and 32 pivotally supporting a pair of substantially semi-circular Greenwich hour angle vanes 34 and 36 hereinafter referred to as G. H. A. vanes. The vanes 34 and 36 have equal radii and are concentrically mounted so far as the radius of curvature of each is concerned. The G. H. A. vanes 34 and 36 may be angularly adjusted about their common pivot or axis. The vane 34 is fixedly attached to a downwardly projecting leg 40, terminating in a radially disposed arm member 42 having a bifurcated end pivotally supporting a pawl member 44. This pawl member 44 may be seated in a notch in an adjustably mounted indicant 46 controlled by a worm screw 48 meshing with the teeth 16 in the margin of the disc 14. Whenever the screw 48 is rotated one way or the other, it actuates the indicant 46 peripherally with respect to the disc 14, in that the threads of the screw or worm 48 engage the gear teeth 16 of the disc 14. The pitch of the teeth 16 may be one degree. By graduating the head of the worm screw 48 in minutes, the indicant 46 may be very accurately positioned. The indicant 46 is pivotally attached to the center of the disc 14 by a suitable link or arm 46a mounted on the under side of the disc 14. By actuating the pawl member 44 out of the slot in the indicant 46, it can readily be seen that the vane member 34 may be adjusted angularly by actuating the arm member 42 in a clockwise or a counter-clockwise direction, as viewed in Figure 1.

The vane 36 is also provided with a downwardly projecting leg 50 merging into a radially disposed arm 52 having a bifurcated end adjustably supporting a pawl member 54 adapted to engage a notch in the indicant 56 provided with a worm screw 58 having indicia graduated to minutes on the head 58a. The worm screw 58 meshes with the gear teeth 16. The indicant 56 is mounted upon an arm 46a extending under the disc 14 and pivoted to the center thereof. The G. H. A. vane 36 may also be angularly adjusted by actuating the arm 52 either clockwise or counter-clockwise, as shown in Figure 1.

A meridian vane 60 is also pivotally mounted upon the bearing members 30 and 32 on an axis common to the axis of vanes 34 and 36. Member 60 is provided with marginally disposed gear teeth 62, the gear teeth 62 subtending an arc greater than 180°. The vane 60 has an arcuate extension 61, as clearly shown in Figs. 1 and 4, extending over the pole to permit reading of a fix in the vicinity of the polar region. This extension 61 permits the solving of navigational problems when the sub-stellar spots of the observed stars are on the opposite side of the pole from the observer. The meridian vane 60 is also provided with a downwardly projecting leg 64 provided with a radially disposed arm 66 overlying the disc 14 and provided with a pointer 70 pointing to the graduation 15 in the margin of the disc 14, there being one graduation 15 for each gear tooth 16. A pointer 71, straddling the margin of the disc 14, may be actuated so as to align the pointer 71 with the pointer 70 to facilitate reading of the position of the meridian vane 60. This pointer 71 may be adjusted by rotating the knurled head 75 mounted upon a shaft 73 supporting a worm gear that has not been shown that meshes with the teeth 16 of the disc 14. The pointer is held against the margin by means of the spring 71a, as clearly shown in Figure 5. The G. H. A. vanes 34 and 36 extend from pole to pole. The meridian vane 60 extends from the lower pole up beyond the upper pole. The G. H. A. vanes 34 and 36 are provided with marginal gear teeth 74 at 1° intervals. These vanes are also provided with graduations 76, there being one graduation for each degree and each tooth. The meridian vane 60 is provided with similar gear teeth and similar graduations.

Each of the vanes 34 and 36 is provided with a latitude indicant 80 mounted upon a housing member 82 provided with a worm screw 84 having a graduated knob. The worm screw 84 meshes with the gear teeth 74, the housing 82 being connected by a suitable arm 86 so as to permit it to rotate around the theoretical center of its G. H. A. vane member 34 or 36, as the case may be. The arm 86 terminates in a circular ring portion 87 mounted for rotation upon the circular projection 89 integral with the G. H. A. vane 34. The arm 86a terminates in a circular ring portion 87a mounted for rotation upon the circular projection 89a integral with the G. H. A. vane 36. By rotating the worm screw 84, the indicant of the G. H. A. vane 34 or the G. H. A. vane 36, as the case may be, may be adjusted to any position along the margin of these radial vanes.

A pair of arcuate quadrants 90 and 92, 90 being associated with the G. H. A. vane 34 and 92 being associated with the G. H. A. vane 36, are pivotally attached to the housings 82. Each of these quadrants 90 and 92 is provided with gear teeth 94 registering with the degree indicia 96, spaced 1° apart. The pivotal mounting for the quadrants 90 and 92 are identical, and that being the case, only one will be described.

This pivotal mounting includes a bifurcated housing 100 provided with an arcuate support 102 for supporting the quadrant. The bifurcated housing 100 is pivotally attached to the housing member 82, the axis of rotation of the pivot coinciding with the radius of curvature of the G. H. A. vanes 34 and 36. One of the furcations of the housing 100 is provided with an opening 104 in which is located an indicant 106 registering with the graduations 96 on the quadrant mounted in the housing. A worm screw 110, provided with a head graduated in minutes, is rotatably mounted in the bifurcated housing 100 and engages the gear teeth 94 of its quadrant. The outer ends of the quadrants are provided with hinge-like portions or eyes 112 and 114, 112 being integral with the quadrant 90 and 114 being integral with the quadrant 92. A movably mounted aligning pin 116 is projected through the eyes 112 and 114 into an adjustably mounted head member 118 supported upon a radially disposed arm 120 pivotally attached to the center of the meridian vane 60. The adjustably mounted member 118 may be peripherally adjusted upon the meridian vane 60 by a worm screw 122 provided with a head graduated in minutes. The adjustably mounted member 118 is provided with an indicant 126 registering with the indicia on the meridian vane 60.

*Mode of operation*

Before determining the observer's position, he first determines the exact time that he wishes to take the sextant reading. The he refers to the American Nautical Almanac to determine the sub-stellar spot of two stars for that particular time. The information is then set up on the fix finder, that is, the G. H. A. vane 34 is adjusted by means of the arm 42 and the indicant 46 to the G. H. A. reading obtained for one star from the American Nautical Almanac. The indicant 80, by actuating the worm screw 84 is adjusted so as to register the north or south declination, as the case may be, for the position of that particular star. The G. H. A. vane 36 and the indicant 80 associated therewith are adjusted to the data obtained for the other star. The sextant readings of the two stars selected for measurement are then taken at the exact time set for taking the readings.

Before setting the quadrant, the pin 116 and the tubular member 115 are first removed. The co-altitude of the first star is then used for positioning the quadrant 90 associated with the G. H. A. vane 34. This adjustment is obtained by adjusting the graduated head of the worm screw 110. After the first quadrant has been adjusted to correspond to the co-altitude of the first star, the quadrant 92 associated with the G. H. A. vane 36 is then adjusted, so that the degrees registering with the indicant on the quadrant 92 correspond to the number of degrees of the co-altitude of the second star. There are two possible positions for the ends of the quadrants 90 and 92 in which the eyes 112 and 114 are aligned. One of these positions may be further north than the other, that is, one of these positions would be north of a line extending from the sub-stellar spot of the first star drawn to the sub-stellar spot of the second star. Usually the observer will know by his dead reckoning data whether he is north of or south of the line interconnecting the two sub-stellar spots. If the observer knows that he is north of this position, he adjusts the quadrants 90 and 92 so that the apex of the angle formed by joining the two quadrants is directed upwardly. If he knows he is south of the line, he joins the two ends of the quadrants in such a manner that the apex is directed downwardly. The above operations cover problems north of the equator. The opposite would be true south of the equator.

The ends of the quadrants 90 and 92 are then adjusted so as to cause the eyes 112 and 114 to register and the aligning tube 115 is inserted to hold the quadrants hinged together either with the apex of the angle of the quadrants 90 and 92 directed upwardly or downwardly, as is required for the particular position of the observer.

The aperture in the head member 118 is then aligned with the opening in the tube 115 and the pin 116 is then inserted through the tube 115 into the aperture in member 118. After the pin 116 has been mounted in position, member 122 is adjusted to cause its carriage 123 to move into contact with member 118. Member 122 is then used in reading the angular position.

When the pin has been inserted into the eyes 112 and 114 and into the aperture in member 118, two spherical triangles have been formed.

The perimeter of vane 60 between the extended pivot and the center of the aperture of member 118 is a common side.

That part of quadrants lying between their respective vanes and the center of the aperture in member 118 form a respective side of each.

The segments of vanes 34 and 36 lying between the points of declination and the pole-polar distances form the other sides respectively.

Two angles at the pole are formed one between vane 34 and vane 60, the other between vane 36 and vane 60. The angle adjacent to vane 34 is an element of the spherical triangle to the right of the center axis, as viewed in Figure 4. The angle adjacent the vane 36 is an element of the spherical triangle to the left of the center axis.

Two angles are formed at the point where vane 60 intersects the angle formed by the two quadrants over a point on member 18—one each forming an angle of the triangle nearest its respective vane.

Two additional angles are formed where the planes of the quadrants intersect the respective vanes to which they are mounted, one belonging to the triangle adjacent to vane 34 and one to the triangle adjacent to vane 36.

Thus, two spherical triangles have been formed (1) From information derived from sextant readings
(2) From information derived from the chronometer and the American Nautical Almanac
(3) From the movements of the various members of the instrument.

The magnitude of each side and each angle is indicated on the instrument.

The specific information required to establish a "fix" is the intercept on vane 60 between the center of pin 116 and the zero position on vane 60. This arc represents the latitude of the observer, the whole degrees of which are read opposite the indicator 126 on member 118, the minute divisions on the thumb screw 122.

The other specific information required to establish a "fix" is the angular distance of the vane 60 on which the above point is located, from the prime meridian. This would be the longitude of the place. This angle or longitude is indicated by the pointer 70 and read from the inside row of figures on scale 18.

Thus we have the longitude and latitude of the observer or a "fix."

The values of the other angles and sides are of great value in solving other problems of navigation and astronomy. These values may be determined by reading the various indicators adjacent to the azimuth angles.

The meridian angles are read upon scale 18.

The azimuth angles are read on dial scales 160 in cooperation with the indicant 161.

The device may be used to solve additional spherical triangles by adding G. H. A. vanes and quadrants.

In Figures 7 and 8 three G. H. A. vanes have been shown. In addition to the vanes 34 and 36, a third vane 236 has been shown. By using three vanes it is possible to detect an error in the reading or interpolation of the data obtained from the American Nautical Almanac and an error or errors may may be made when adjusting the fix finding device, or errors in making sextant observations of the stars. If an error has been made, the apertures in the extremities of the three quadrants would fail to align, thereby clearly indicating that no accurate indication of the observer's position is available.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fix finder for use in celestial navigation including a pair of semi-circular vanes, means for pivotally mounting the vanes so as to permit adjustment of the vanes into any desired meridian, a pair of indicants one for each of the vanes, said indicants moving with the vanes, a circular member having a graduated scale, the indicants registering with the scale so that as the vanes are adjusted from one position to another the indicants designate the meridians, a pair of adjustable indicants one for each of the vanes, the margins of the vanes being provided with a graduation for indicating latitude, a pair of arc measuring members graduated in degrees, means for mounting the arc measuring members so as to align the arc measuring members with the last mentioned indicants, means for adjusting the arc measuring members independently of each other and with respect to the mounting means therefor, and means for indicating the point of contact of the extremities of the arc measuring members.

2. A fix finder for use in celestial navigation including a pair of semi-circular arcuate members, means for pivotally mounting the arcuate members upon a common axis so as to permit the adjustment of the arcuate members so as to generate a spherical surface, means for indicating the angular adjustment of the arcuate members, a pair of adjustable means mounted for peripheral adjustment on the arcuate members, each of said adjustable means including an outwardly directed pivotal extending outwardly from its arcuate member, a pair of arc measuring members mounted upon said last mentioned means, said arc measuring members being mounted upon the pivots to permit the arcuate members to rotate through 360° independently of each other, so as to generate a pair of circles, means for actuating said arc measuring members to measure the desired arc, means mounted for rotation about said common axis, and an indicant mounted for adjustment upon said last mentioned means for indicating the relative position of the points of intersection of said circles.

3. A fix finder for use in celestial navigation utilizing sub-stellar spots, said fix finder including a pair of arcuate members, means for pivotally mounting the arcuate members upon a common axis of rotation so as to permit the adjustment of the arcuate members so as to generate a spherical surface, means for indicating the angular adjustment of the arcuate members, a pair of adjustable means mounted for peripheral adjustment on the arcuate members, each of said adjustable means including a radially disposed outwardly directed pivot, a pair of arc measuring members mounted upon said last mentioned means, said measuring members being adjustable independently of each other through an angle of 360°, said arc measuring members being mounted for adjustment of the arcs to be measured, an arcuate member subtending an arc of more than 180°, said last mentioned arcuate member being pivotally mounted upon said common axis with a portion thereof extending across said axis to permit indication of the location of the observer either on the same side of the pole as the sub-stellar spots or on the opposite side or at the pole.

4. A fix finder for use in celestial navigation utilizing sub-stellar spots, said fix finder including a pair of arcuate members, means for pivotally mounting the arcuate members upon a common axis of rotation so as to permit the adjustment of the arcuate members so as to generate a spherical surface, means for indicating the angular adjustment of the arcuate members, a pair of adjustable means mounted for peripheral adjustment on the arcuate members, each of said adjustable means including a radially disposed outwardly directed pivot, a pair of arc measuring members mounted upon said last mentioned means, said measuring members being adjustable independently of each other through an angle of 360°, said arc measuring members being mounted for adjustment of the arc to be measured, and an arcuate member, said last mentioned arcuate member being pivotally mounted upon said common axis with a portion thereof extending across said axis to permit indication of the location of the observer either on the same side of the pole as the sub-stellar spots or on the opposite side or at the pole.

5. A fix finder for use in celestial navigation including a plurality of semi-circular arcuate members, means for pivotally mounting the arcuate members so as to permit the adjustment of the arcuate members to generate a spherical surface, said arcuate members being mounted for adjustment about a common axis, means for indicating the angular adjustment of the arcuate members, a plurality of adjustable means mounted for peripheral adjustment on the arcuate members, there being one adjustable means for each arcuate member, a plurality of arc measuring quadrants, one for each of said adjustable means, said quadrants being mounted for pivotal rotation upon said adjustable members, the quadrants being adjustable for rotation and for arc measurements independently of each other, said arc measuring quadrants being mounted for adjustment to measure predetermined arcuate distances, one extremity of each quadrant terminating in an aligning aperture, the quadrants upon being adjusted for arc measurement being then rotated into a position such that the apertures in the extremities of the quadrants register with each other, a tubular member passing through the apertures for holding the ends of the quadrants in a fixed position, means mounted for rotation upon said common axis, said last mentioned means including a member freely adjustable, said member having an aperture that may be aligned with the aperture through said tubular member, a pin inserted through the tubular member and into the aperture of the freely adjustable member, and an indicant mounted for adjustment upon said last mentioned means for indicating the relative position of the extremities of the quadrants as determined from the position of the apertures therein.

6. A fix finder for use in celestial navigation including three semi-circular arcuate members, means for pivotally mounting the members upon a common axis so as to permit the adjustment thereof to generate a sperical surface, means including a disc lying in a plane normal to the axis of the pivotal mounting of the semi-circular members for indicating the angular adjustment thereof, three carriages one for each of the members, each carriage being mounted for peripheral adjustment upon its semi-circular member, three arc measuring quadrants pivotally mounted for adjustment upon said carriages, there being one quadrant for each carriage, said quadrants being mounted for pivotal rotation upon its carriage and for arcuate adjustment thereon, each of said quadrants being provided with marginal teeth, a worm screw mounted upon the carriage and engaging the teeth of the quadrant for adjusting the quadrants, each of the quadrants terminating in an aperture, the quadrants being mounted for angular and arcuate adjustment independently of each other, upon each of the quadrants being adjusted to measure a predetermined arc the apertured extremities of the quadrants being then adjusted angularly into alignment so as to cause the apertures therein to be aligned, a tubular member passing through the apertures and holding the apertures in the quadrants in a fixed position, a member provided with a radially disposed aperture freely adjustable in the surface of the sphere generated by the semi-circular members, said apertured member being adjustable into alignment with the apertures in the extremity of the quadrants, and means for indicating the relative position of the apertured member so as to determine the position of the extremities of the quadrants.

7. A fix finder for use in celestial navigation including three semi-circular arcuate members, means for pivotally mounting the arcuate members so as to permit the adjustment of the arcuate members to generate a spherical surface, said arcuate members being mounted for adjustment about a common axis, means for indicating the angular adjustment of the arcuate members, said means including a graduated disc offset from the arcuate members and extending in a plane normal to the common axis of rotation, and three arms one for each of the arcuate members, means for attaching the arms to the arcuate members so that upon the arms being adjusted to a predetermined angular position the semi-circular arcuate members are adjusted to this same angular position, a plurality of adjustable means mounted for peripheral adjustment on the arcuate members, there being one adjustable means for each of the arcuate members, the arcuate members being provided with graduations to indicate the relative position of the adjustable means, three arcuate quadrants freely mounted upon said adjustable means, there being one arcuate quadrant for each of the adjustable means, said quadrants being rotatably mounted upon pivots so as to permit rotation of the quadrants independently of each other, the quadrants having arcuate adjustments used in measuring arcuate distances from the pivotal points, means for temporarily securing the ends of the quadrants together, means for indicating the angular position of the quadrants when the ends of the quadrants are secured together, and indicating means freely adjustably mounted to any position in the spherical surface generated by the arcuate members, said indicating means upon being brought into reigstry with the ends of the quadrants indicating the position of the ends of the aforementioned graduated arcuate members and indicating the arcuate distances from the points where the pivotal axes of the arcuate members intersect the spherical surface generated by the arcuate members and the position where the ends of the quadrants are joined together.

LOUIS J. ZERBEE.

REFERENCES CITED

The following references are of record in the file of this patent:

UNITED STATES PATENTS

| Number | Name | Date |
|---|---|---|
| 780,225 | Pellehn | Jan. 17, 1905 |
| 943,532 | French et al. | Dec. 14, 1909 |
| 1,547,940 | Monney | July 28, 1925 |
| 2,064,062 | Hagner | Dec. 15, 1936 |
| 2,367,128 | Jorgenson | Jan. 9, 1945 |
| 2,374,788 | Steele | May 1, 1945 |
| 2,466,225 | Gee | Apr. 5, 1949 |

FOREIGN PATENTS

| Number | Country | Date |
|---|---|---|
| 573,653 | Germany | Apr. 3, 1933 |